Sept. 27, 1932.  H. SYNCK  1,879,588
CORN PICKING MACHINE
Filed July 27, 1931  4 Sheets-Sheet 1
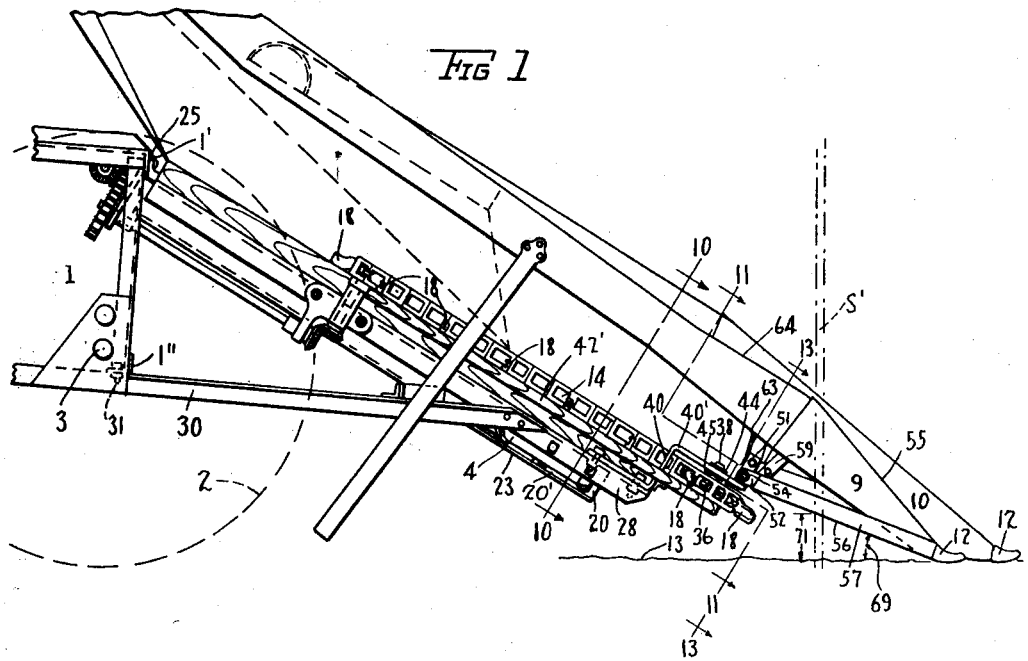
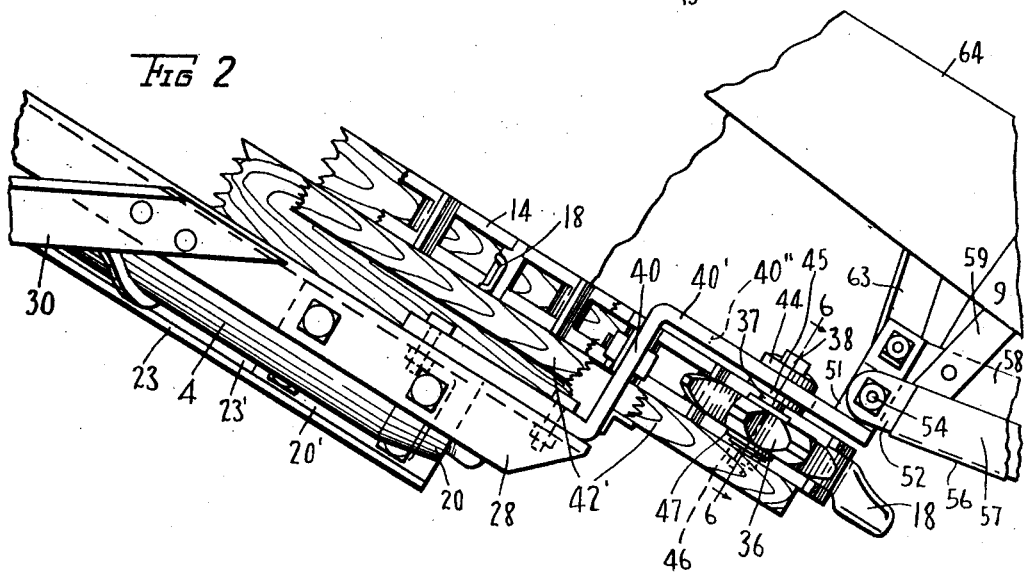
INVENTOR
Henry Synck
BY
Staley & Welch
ATTORNEYS

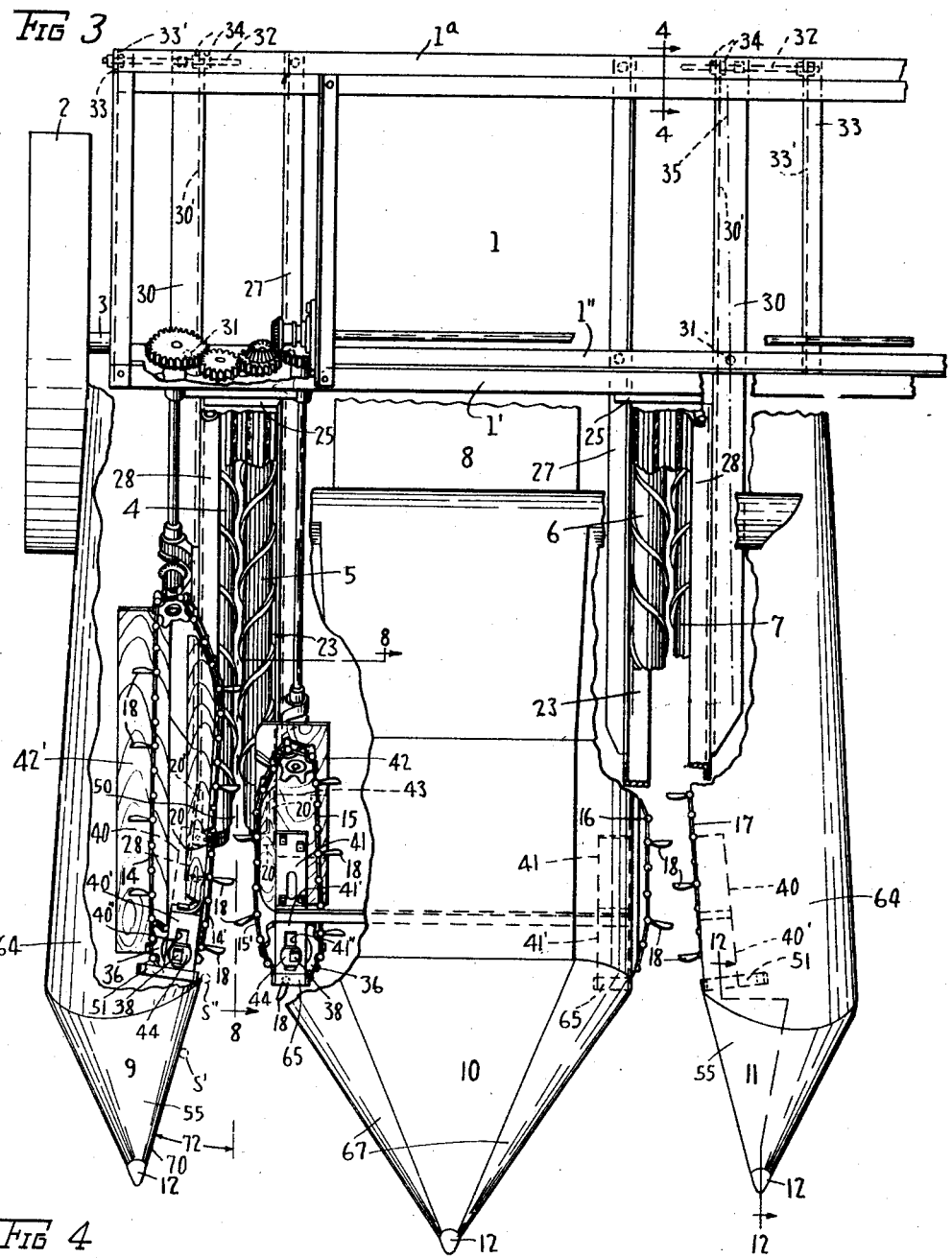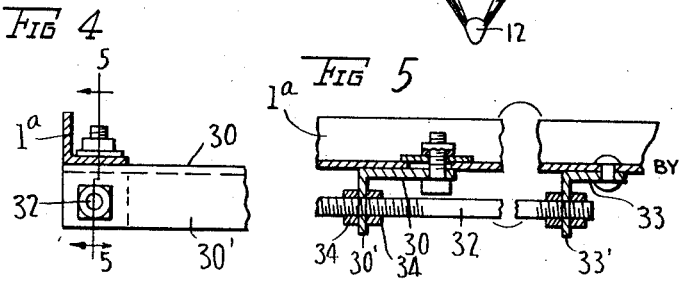

Sept. 27, 1932.　　　　H. SYNCK　　　　1,879,588
CORN PICKING MACHINE
Filed July 27, 1931　　　4 Sheets-Sheet 3
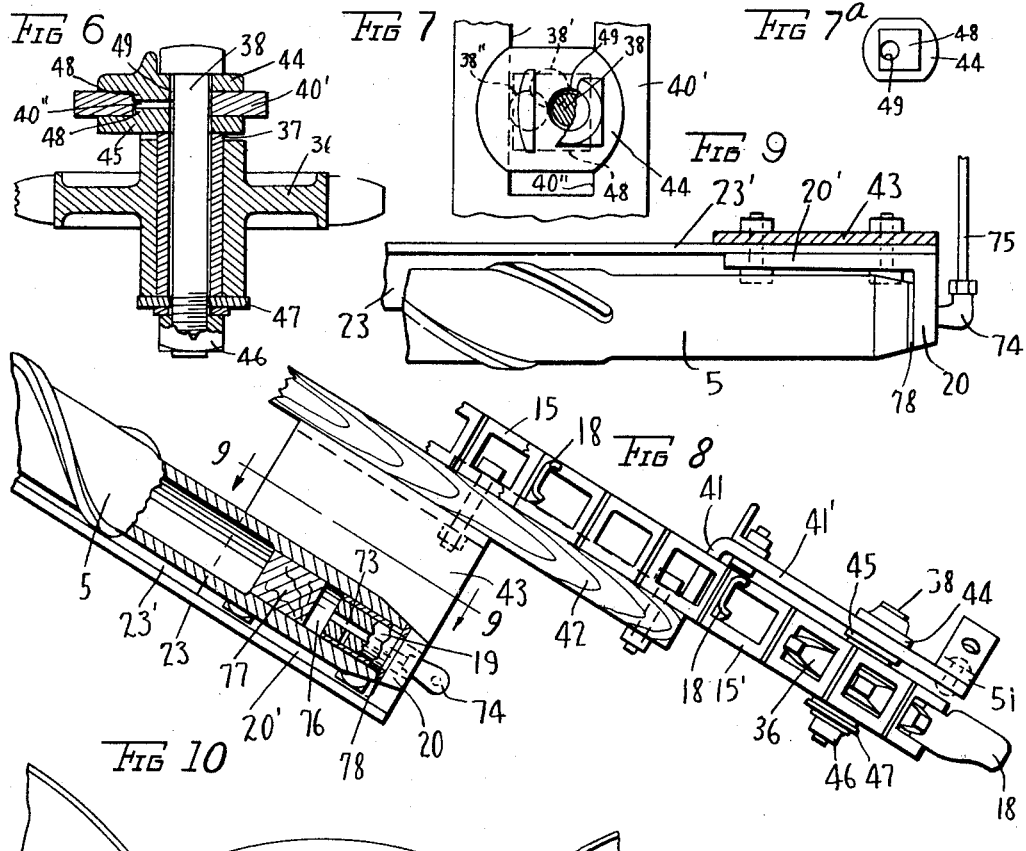
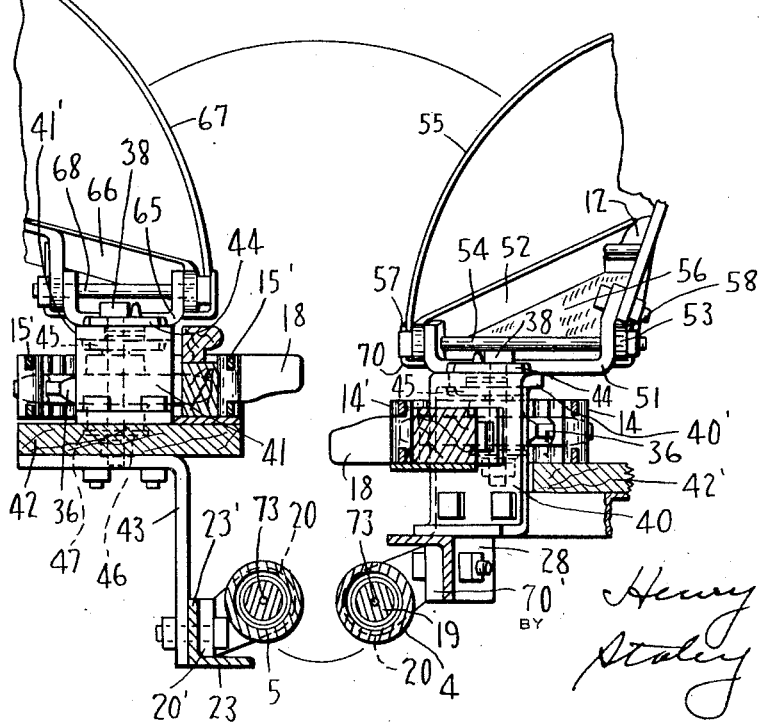

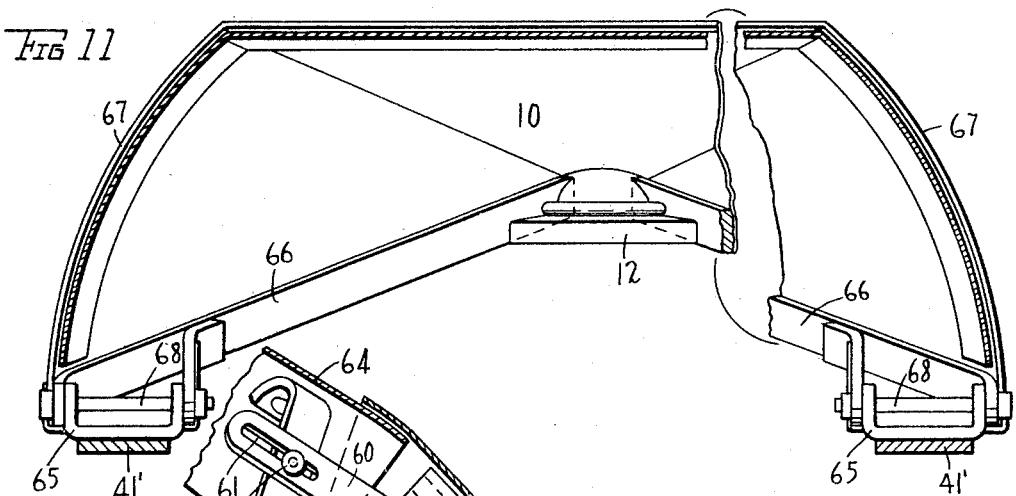
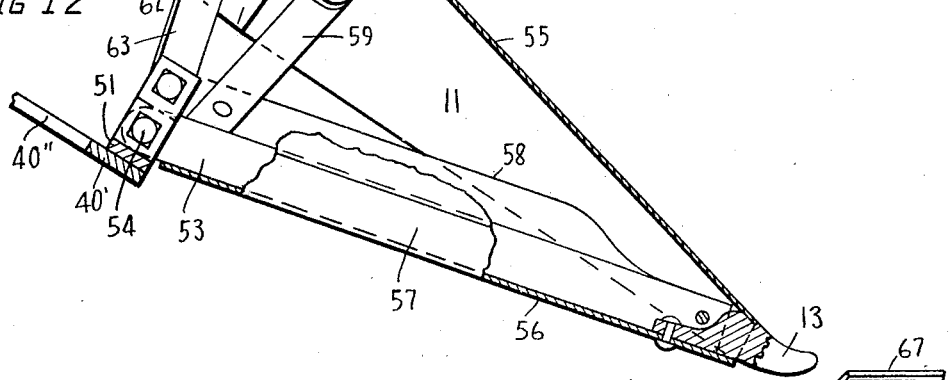
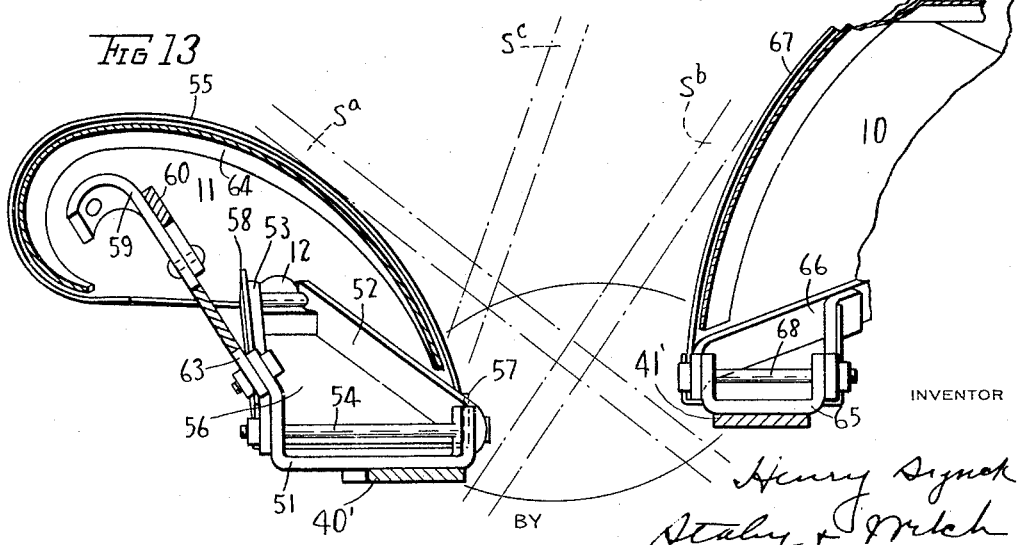

Patented Sept. 27, 1932

1,879,588

UNITED STATES PATENT OFFICE

HENRY SYNCK, OF COLDWATER, OHIO, ASSIGNOR TO THE NEW IDEA SPREADER COMPANY, OF COLDWATER, OHIO, A CORPORATION OF OHIO

CORN PICKING MACHINE

Application filed July 27, 1931. Serial No. 553,245.

This invention relates to improvements in corn picking machines, it more particularly relating to the gathering and snapping mechanism.

In machines of this kind the picking operation is greatly hampered not only by down stalks over which the inclined shoes ride and which are prevented from being gathered by the gathering chains due to the close proximity of the shoes to the ground, but also by the breaking of those stalks at or near the ground line which do not stand in line with the throat of the gathering mechanism and are consequently broken to a greater or less extent by the shoes due to the close proximity of the shoes to the ground line throughout their entire length.

One of the objects of this invention is to so construct and arrange the gathering shoes and chains as to provide for a smooth delivery of the stalks from the inner edge of the shoes to the inner runs of the gathering chains and for a pronounced clear space beneath each shoe in advance of the path of the returning gathering fingers of the chains at the lower end of the path thereof, and to also extend the extreme lower end of the run of the chain to a point close to the ground line whereby down stalks which pass beneath the inner portions of the shoes can be gathered by the fingers of the chains without the danger of breaking the stalks by the action of the fingers and shoes thereon; a further object in this connection, with more particular reference to the arrangement of the shoes, being to eliminate the danger of breakage of those stalks which are not in direct line of the throat of the gathering mechanism by an arrangement which causes the lower inner edges of the shoes to engage the stalks at a point higher from the ground than heretofore.

A further object of the invention is to provide simple and effective means for adjusting the distance between the gathering chains of a pair independently of the means for adjusting the distance between the snapping rolls of that pair whereby the snapping rolls may be adjusted to a predetermined distance with relation to each other and the gathering chains likewise adjusted to another and different predetermined distance.

Another object of the invention is to improve the manner of journalling the forward lower end of the snapping rolls.

Other objects of the invention will appear from the accompanying description and claims.

In the accompanying drawings:

Fig. 1 is a side elevation of so much of a corn picking machine as is needed to illustrate the improvements.

Fig. 2 is an enlarged fragmentary elevation of parts seen in Fig. 1.

Fig. 3 is a top plan view of part of the machine.

Fig. 4 is an enlarged fragmentary longitudinal section on the line 4—4 of Fig. 3.

Fig. 5 is an enlarged fragmentary transverse section on the line 5—5 of Fig. 4.

Fig. 6 is a further enlarged fragmentary transverse section on the line 6—6 of Fig. 2.

Fig. 7 is a partial top plan view of the mechanism shown in Fig. 6, the view being in the same scale as Fig. 6.

Fig. 7ª is a plan view on a reduced scale of a detail.

Fig. 8 is an enlarged fragmentary elevation viewed from the line 8—8 in Fig. 3, the view being partly in longitudinal section.

Fig. 9 is an approximately horizontal section taken on the line 9—9 of Fig. 8, and is on the same scale as Fig. 8.

Fig. 10 is an enlarged fragmentary approximately vertical section on the line 10—10 of Fig. 1.

Fig. 11 is an enlarged transverse section of a portion of the mechanism in detail, the view being taken on the line 11—11 of Fig. 1.

Fig. 12 is an enlarged longitudinal section on the line 12—12 of Fig. 3.

Fig. 13 is an enlarged transverse section on the line 13—13 of Fig. 1, the view being a fragmentary view of details located at the far side of the machine as viewed in Fig. 1.

Referring to the drawings in which some of the more irrelevant details are shown conventionally, 1 represents a portion of the main frame carried on wheels 2 journalled on stub axles 3, but one such wheel and axle being indicated. In the present machine two sets of similarly-constructed gathering and snapping devices are employed, but the invention is equally applicable to a machine having but a single set of such devices. The snapping rolls, which are arranged in pairs, are indicated at 4 and 5, each pair acting upon the stalks of two rows simultaneously, snapping the ears therefrom and allowing them to drop into a central elevator (not shown), the space which the elevator occupies being indicated at 8. From the central elevator the ears are dropped into a chute in advance of the husking rolls in the usual manner, the chute and husking mechanism not being shown in the present drawings.

The best results in picking are obtained when the stalks are not accidentally broken at or near the ground line, this being for the obvious reason that there is then little or no liability for such stalks to fall in any manner or direction whereby subsequent picking is made impossible. It may be further stated that it is not practical from a mechanical standpoint to so design the snapping rolls that the lower ends thereof operate extremely close to the ground. Those devices which are of benefit in guiding, picking up or arranging the stalks for the subsequent action of the snapping rolls are, in my improved construction, so designed as to eliminate the liability of stalk breakage, as well as enabling the chains to pick up down stalks beneath the shoes. This applies not only in the case of a corn crop in an adverse condition, such as down or tangled corn, but also to corn in an otherwise good condition, which apparently should give little or no trouble, but among which, due to the inevitable swinging of the machine and also due to the fact that it is not always possible to draw the machine in a straight line, some stalks, more especially those in a scattered or off-center hill, are often broken at the roots by the gathering devices of prior constructions, so as to make it impossible to properly direct such stalks to the snapping rolls.

The elements of the gathering devices that first encounter the stalks as the machine advances along the rows are the shoes. These are indicated at 9, 10 and 11. In the present construction these are made of sheet metal re-enforced by bars and rods. Following a usual practice, the shoes are pivotally connected to the machine frame in order to allow the forward extremities to slide or float on the ground regardless of the working elevation of the machine. The forward ends terminate in a snout casting 12 and due to their shape and closeness to the ground line, indicated at 13, between rows, the snouts slide under most of the down stalks, the rearward portion of the shoe either guiding the stalks to the snapping rolls or turning them aside to be picked up on the next traverse of the machine in the field.

The stalks are then acted upon by the gathering chains, of which is shown in the present case, one pair for each pair of snapping rolls. The chains are indicated at 14, 15, 16 and 17, the adjacent runs of which move in the same direction, i. e., upwardly over the approximate center of their respective snapping rolls. The chains, on account of their association with the snapping rolls operate in approximately the same oblique plane, the angle of which may be given as being substantially 30 degrees with the horizontal. While this slope was determined upon to gain the best efficiency in the snapping roll operation, it lends itself to a greater efficient forward extension of the gathering chains in the present construction. It will be seen in Figs. 1, 2 and 8 that the fingers 18 with which the chains are equipped at spaced intervals move in a free space beneath the shoes in close proximity to the ground, and also rake from some distance on either side of the row towards the center thereof.

From the description, the advantages of providing an ample clearance space below the shoes in advance of the paths of the gathering elements and inwardly toward the center line between the chains will be seen. In order to preserve the space against encroachment by working parts of the machine, all such details have been altered and relocated. The lower forward extremity of each of the inner snapping roll of each pair is journalled on a bearing comprising a trunnion 19 fixed in a bracket 20, illustrated in connection with the roll 5. (See Figs. 8 and 9.) The bracket 20 is secured to the lower end of an angle section member 23 which extends forwardly and downwardly from a casting 25 (Fig. 3) attached to the upper forward rail 1' of the frame 1. The lower end of the member 23 is further braced to the frame 1 by a horizontally disposed angle-section member 27 extending forwardly from and underneath the rear portion of the frame 1; the member being rigidly bolted or secured thereto. The length of the member 23 is but little more than is necessary to extend slightly beyond the end of the snapping roll, as the shank 20' of the bearing 20 is rearwardly disposed, by which construction no encroachment on the clear space is made by reason of the lower bearing for the inner roll 5.

The bearings for the outer snapping rolls 4 and 7 are similar, being right and left handed, and are each secured to an angle-section member 28 similarly attached to the corresponding casting 25, shown in connection with the outer roll 4 (Fig. 10). In the present case the members 28 extend further forwardly, for another purpose, than the members 23, but each is bent laterally at its lower end and thereby its encroachment is limited to a minimum upon the free space mentioned. Each member 28 is braced to the frame 1 by a horizontally disposed angle-section member 30 which is pivotally connected by a bolt 31 to the lower forward rail 1″ of the frame 1, while its rearward extremity is clamped by bolting to the lower rear rail 1ª. This particular construction is for the purpose of varying the center-to-center distance of each of a pair of rolls, this lateral adjustable feature being preferable in view of a thick or thin stalk crop condition. This adjustment is made through the medium of a threaded rod 32 extending sidewise from the down-turned leg 33′ of an angle-section anchoring member 33, the rod having a nut 34 on each side of the downturned leg 30′ and 31′ of the member 30, through which the rod passes. In turning the nuts, the center-to-center distance of a pair of rolls may be varied, a different position being indicated by the broken line 35, Fig. 3.

The lower end of each gathering chain is supported on an idle sprocket carried on bearings secured to the same member which supports the snapping roll over which it is mounted.

Each of the sprockets is so supported that the fingers of the chain will move in a clear space beneath the shoe and to this end there is provided a bracket 40 and 41 for each sprocket which has an upwardly offset portion 40′ and 41′ forward of its support and the sprocket wheel is secured to the under side of this offset portion.

Since the supporting members for the rolls 4 and 7 are adjustably attached to the frame, a lateral adjustment of the center-to-center distance of the rolls of each pair results in a slight alteration of the distance between the chains of each pair. Such alteration may or may not be of benefit considering certain crop conditions, and provision is therefore made to vary the position of the idle sprocket of each chain, and thereby vary the distance between the chains of either pair irrespective of the adjustment of the snapping rolls.

This chain adjustment also provides the further advantage in permitting an adjustment to suit methods of planting in various localities as the center-to-center distance between rows may vary from three feet to three and one-half feet. The manner of supporting the gathering chain idle sprockets, both for the purpose of providing this adjustable feature and for the preservation of the clearance space, is best seen in Figs. 2, 6, 7 and 8, illustrating the sprockets for the chains 14 and 15. The sprockets are alike and are indicated at 36, each rotatably supported on a tube 37 through which is passed a bolt 38, the bolt passing through a slot 40″ longitudinally positioned in the upwardly offset portion 40′ of the bracket 40 and in a similar slot 41″ in the bracket 41.

In the case of the bracket 40 for the chain 14, this bracket is secured to the lower extremity of the member 28, as shown best in Fig. 2. In the case of the bracket 41 for the chain 15, this bracket is secured to the upper surface of a wooden member 42 on which the chain bears, the wooden member in turn being supported on an angle member 43 secured to the side of the up-turned legs 23′ of the angle member 23 as best seen in Figs. 8 and 10.

The head of the bolt 38 rests on an especially formed washer 44 placed on the upper surface of the upwardly offset portion of the corresponding bracket. The body of the bolt passes through a washer 45 practically identical to the washer 44, the washer 45 being placed on the under side surface of the upwardly offset portion. A nut 46 and a plain washer 47 are employed at the lower end of the bolt 38, the tube 37 being interposed between the plain washer 47 and the washer 45, so that when the nut 46 is drawn up, the pressure will be on the tube, and since the hub of the idle sprocket is slightly shorter than the tube 37, the sprocket will be permitted to revolve freely on the tube. The washers 45 and 46 were mentioned as being peculiarly formed, the purpose being to provide a plurality of different working positions for the idle sprocket within the confines of the slots 40″ and 41″. This is accomplished by providing each of the washers 45 and 46 with a square boss 48 of a size slightly smaller than the width of the slot 40″ or 41″ (see Fig. 7ª for detail), the washers being placed on the upper and lower surfaces of the bracket with the bosses in the slot. The bolt 38 passes through an opening 49 eccentrically disposed with relation to the bosses so that the sprocket center may be fixed in a plurality of different working positions, as indicated by the broken circles 38′ and 38″, the total distance the center of the sprocket may be altered being that between the location in which the bolt is shown in full lines as at 38, and the broken circle 38″, Fig. 7. The change of position is readily accomplished by loosening the nut 46 sufficiently to permit the withdrawal of the square bosses 48 from within the slots 40″ and 41″ and replacing the washers after having made a ninety or one hundred and eighty degree turn of the washers, it being understood that the openings 49 in each of the washers 45 and 46 are maintained in alignment. By this means of adjustably securing the mounting for the idle sprockets 36, an adjustment of the adjacent runs of the gathering chains may be made. For example, the pairs of snapping rolls may be assumed to have been laterally adjusted for an extreme center-to-center distance by which the space 50, (at the left side of Fig. 3) between the cylindrical portions of the rolls had been increased to a maximum by the manipulation of the adjusting means specifically illustrated in Figs. 4 and 5, which adjustment may have been desirable in the instance of harvesting a heavy corn crop, wherein inefficient operation may be caused by an undue crushing of the thicker stalks, yet certain other considerations may require the chain adjustment to be at a minimum. In the drawings, in Fig. 3, the adjacent runs 14' and 15' of the left pair of gathering chains are shown in the extreme position.

It has been stated that the inner chains 15 and 16 bear on the wooden members 42. Supports for the outer runs of the outer chains 14 and 17 are also provided, these supports being in the nature of wooden boards indicated at 42'.

During the operation of the machine in the field, the noses or forward ends of the shoes 9, 10 and 12 are in actual contact with the soil surface for the greater percentage of the time of operation, and, owing to the inequalities of the ground, these shoes must be pivotally connected with the machine. In my improved construction these pivotal connections are so disposed as to elevate the rear portion of the shoes to an extent as to provide a comparatively large free and unencumbered space therebeneath to permit the fingers of the gathering chains to readily pick up down stalks and gather them to the snapping rolls and at the same time to allow the shoes to bend over in line with the throat leading to the rolls and those stalks not in line therewith without danger of breaking the stalks.

Each of the outer shoes is pivotally connected to a U-shaped bracket 51 illustrated in connection with the shoe 11 in Figs. 12 and 13, a description of this shoe applying equally to the shoe 9. This bracket is secured in any suitable manner to the upper surface of the forward extremity of the bracket 40. The shoe 11 is made of sheet metal reinforced by bars, such bars being indicated at 52 and 53. These bars are extended sufficiently to the rear to permit the insertion therethrough of a hinge bolt 54 carried by the bracket 51.

Sheet metal is rolled to a form roughly approximating half a cone, designated at 55. A triangularly shaped sheet metal member 56 has upturned edges 57 and 58 which are secured to the bars 52 and 53 with the lower edge of the sheet metal shoe 55 secured between the bar 52 and the edge 57.

At 59 is shown a brace member attached to the upturned edge 58. This member braces the structure of the shoe and also serves to provide a point of attachment for a pivotally connected strap 60. This strap extends rearwardly and is provided with a slot 61 through which is loosely passed a headed pin 62. The pin 62 is fixed in a brace member 63 one end of which is secured to one end of the upturned U-shaped bracket 51; the other and upper end being secured in such a way as to act as a brace to the curved sheet metal shield 64 by which the continuation of the work of the shoes is carried out. The strap 60 permits of free pivotal movement of the shoe in passing over the inequalities of the ground, and when the machine is placed in the transporting elevation, the pin 62 makes contact with the end of the slot 61 to insure the sufficient lifting of the shoe.

The central shoe 10 is hinged upon a pair of U-shaped brackets 65 as shown best in Figs. 11 and 13 each secured to a support 41. This shoe is constructed similarly to the shoe 9 and 11 in that it has brace bars 66 to support the sheet metal portion 61 thereof, each of these bars being pivoted on bolts 68 carried by the bracket 65.

In all the shoes, the sheet metal casings are formed to have a contour that is not only of benefit in guiding and rearranging the stalks, but also that minimum stalk breakage shall occur that is directly traceable to this particular contour. For example, due to the inevitable swinging of the machine, an inner edge of a shoe may bear against an off-center stalk and force that stalk to assume momentarily the position indicated at $S^a$ or $S^b$, Fig. 13, an extreme condition which in freezing weather may break the stalk at the ground line, but no breakage other than this is brought about. It will be seen that the contour of the half-cone 55 and that of the mating surface 67 of the central shoe 10 is formed with a view of permitting such considerable lateral bending of the stalk without eventual breakage. This contingency is further minimized by the fact that the angle with the ground made by the lower inner edge of any shoe is much greater than in prior constructions, due to my improved manner of pivotally connecting the shoes. Referring to Fig. 1, the angle is designated at 69. Now referring to Fig. 3, it will be seen that a stalk as far off-center as that one indicated at S' (the line 8—8 being assumed to be in the center of the row) which distance is given as at least five inches in view of the scale to which this figure is drawn, no deflection of the stalk occurs until the lower inner edge 70 of the shoe 9 makes contact therewith. Again referring to Fig. 1, the stalk S' is shown at the corresponding point at which contact is made, and it will be seen that contact with the stalk is made at a height of approximately four inches above the ground line as at 71. As the machine advances, the stalk will be deflected, due to the angle 72 of the lower edge 70 with the row center, but by reason of the angle 69 contact with the stalk is made at an increasing elevation, until at the point where the shoe passes the stalk entirely, the elevation of the contact of the shoe with the stalk is at a height of about seven inches which would cause a deflection of the stalk in question of approximately twenty degrees from the vertical. This degree of deflection from the vertical is shown by the position of the stalk S$^c$, Fig. 13, which view also shows clearly to what greater extent the stalk may be deflected with no breakage above the point of contact of the shoe with the stalk, this greater deflection being represented by the stalks S$^a$ and S$^b$. The latter stalks show the deflection due to the combined effect of the shoe encountering an off-center stalk accompanied by a simultaneous swing of the machine.

The forward portions of the shields 64 previously mentioned are formed to fit snugly inside the rearward portions of the shoes and to present the same approximate contour at the point of connection. The shoes overlap the forward portions of the shields sufficiently to prevent a gap wherein stalks may lodge and possibly cause clogging.

The means for lubricating the lower ends of the snapping rolls is such that no encroachment is made on the clear space under the ends of the rolls and a further advantage is secured in that the entrance of abrasive particles into the bearing surfaces is prevented. The stud 19 is provided with a central bore 73, and in its lower end is screwed a pipe elbow 74. Through a pipe 75 from some convenient location lubricant is forced through the bore 73 to the chamber 76 in the snapping rolls which are tubular. A plug 77 closes the chamber 76 from the remainder of the roll. When lubricant is forced into the roll the pressure causes the lubricant to flow down and by the exterior cylindrical surface of the stud 19 and outwardly in a radial direction by the thrust washer 78. The outward flow of lubricant during operation prevents entrance of abrasive particles, as the body of lubricant contained within the chamber 76 causes a pressure to be put on the film due to the "head," the expulsion of dirt being greatly accelerated at the time when the chamber 76 is refilled under pressure.

Having thus described my invention, I claim:

1. In a corn picking machine, a pair of inclined side-by-side snapping rolls, a pair of inclined movable side-by-side endless gathering chains above said rolls the path of each of which lies in the same inclined plane throughout and each provided with a series of gathering fingers, said chains being arranged such that the fingers move in a path over the space between said rolls for a substantial distance from the lower ends of said rolls, a pair of pivotally mounted inclined gathering shoes arranged in advance of the rolls and chains, the pivotal point of each shoe being located at its rear end and arranged in a plane above the path of travel of said fingers adjacent said shoes, the fingers moving through a path which extends at least as far forwardly in the machine as the pivotal points of said shoes, the space between the inner under surface of each shoe and the ground in advance of the path of the corresponding gathering chain and its fingers being unencumbered.

2. In a corn picking machine, a pair of inclined side-by-side rotatable snapping rolls, a pair of inclined movable endless chains each moving in the same inclined plane throughout and having gathering fingers arranged above said rolls, said chains being arranged such that the fingers move in a path over the space between said rolls for a substantial distance from the lower ends of said rolls, a pair of inclined shoes to direct stalks to said rolls and chains, the paths of said fingers extending in advance of the lower ends of said rolls and the rear portions of said shoes being in planes above and at least as far to the rear in the machine as said advanced portions of said paths, the space between the inner under surface of each shoe and the ground in advance of the path of the corresponding gathering chain being unencumbered.

3. In a corn picking machine, a pair of inclined rotatable side-by-side snapping rolls, a pair of movable inclined side-by-side endless gathering chains each moving in the same inclined plane throughout and each having spaced gathering elements above said rolls with the paths of said elements in advance of the lower ends of the rolls, said chains extending a substantial distance upwardly from the lower ends of the rolls, a pair of inclined shoes to direct stalks to said rolls and gathering elements, and means for pivotally supporting the rear end of said shoes in planes above the paths of said gathering elements at points adjacent the shoes, said paths extending at least as far forwardly in the machine as the pivotal points of the shoes, the space between the inner under surface of each shoe and the ground in advance of the path of the corresponding gathering element being unencumbered.

4. In a corn picking machine a pair of inclined side-by-side snapping rolls, a pair of inclined endless gathering chains each moving in the same inclined plane throughout and each having gathering elements, sprocket wheels about which said chains pass arranged above the rolls with the lower sprocket wheels in advance of the lower ends of said rolls, a pair of inclined shoes in advance of said rolls and chains to direct stalks thereto, and means for supporting the rear ends of said shoes pivotally in planes above said lower sprocket wheels and at least as far rearwardly in the machine as the lowermost portions of the paths of said gathering elements, the space between the inner under surface of each shoe and the ground in advance of the path of the corresponding gathering elements being unencumbered.

5. In a corn picking machine, a pair of downwardly inclined side-by-side snapping rolls, a pair of movable inclined endless side-by-side gathering chains each moving in the same inclined plane throughout and having gathering elements arranged above said rolls with the paths of the gathering elements extending beyond the lower forward ends of the rolls, and a pair of shoes inclined to the ground and also having their inner sides inclined to form a converging throat leading to the space between said rolls and substantially in line with the inner runs of the gathering chains, the inclination to the ground of said shoes being such as to position the rear ends of said shoes above and at least as far rearwardly in the machine as the lower portions of the paths of said gathering elements so as to cause the inner lower edges of the rear portions of the shoes to engage stalks at a substantial distance above the ground and deliver same directly to said gathering elements, the space between the inner under surface of each shoe and the ground in advance of the corresponding gathering elements being unencumbered.

6. In a corn picking machine, a pair of snapping rolls, means for adjusting the distance between said rolls, a pair of gathering chains above said rolls, and means independent of the roll adjusting means for adjusting the distance between said chains, the extreme lower ends of the runs of the chains mainly in a lateral direction to vary the distance therebetween.

7. In a corn picking machine, a pair of supports, a snapping roll and a gathering chain on each support, means for adjusting the distance between said supports, and means independent of said adjusting means to adjust the distance between said chains, the extreme lower ends of the runs of the chains mainly in a lateral direction to vary the distance therebetween.

8. In a corn picking machine, a pair of snapping rolls, means for adjusting the distance between said rolls, a pair of gathering chains above said rolls, an upper and a lower sprocket wheel for each chain, each lower sprocket being located at the extreme lower end of the chain and means for adjusting the positions of the lower sprocket wheels mainly in a lateral direction to vary the distance between the same.

9. In a corn picking machine, a pair of supports, a snapping roll and a gathering chain mounted upon each support, means for adjusting the distance between the supports, an upper and a lower sprocket wheel mounted upon each support for the chain associated therewith, each lower sprocket being located at the extreme lower end of the chain and means for adjusting the position of said lower sprocket wheels mainly in a lateral direction with relation to each other, independently of the adjustment of said supports to vary the lateral distance between the extreme lower ends of the chains.

10. In a corn picking machine, a support, an upper and lower sprocket wheel mounted upon said supports, a gathering chain passing about said sprocket wheels, the supports for the lower sprocket wheel having a straight sided opening, a bearing member, a bolt passing therethrough, a pair of clamping members through which said bolt passes, one on each side of the support, each clamping member having a straight sided boss adapted to be received in the straight sided opening in said support and also a bolt opening to receive the bolt arranged eccentric to the boss, together with means for clamping the parts together.

In testimony whereof, I have hereunto set my hand this 16th day of June, 1931.

HENRY SYNCK.